Patented Nov. 7, 1950

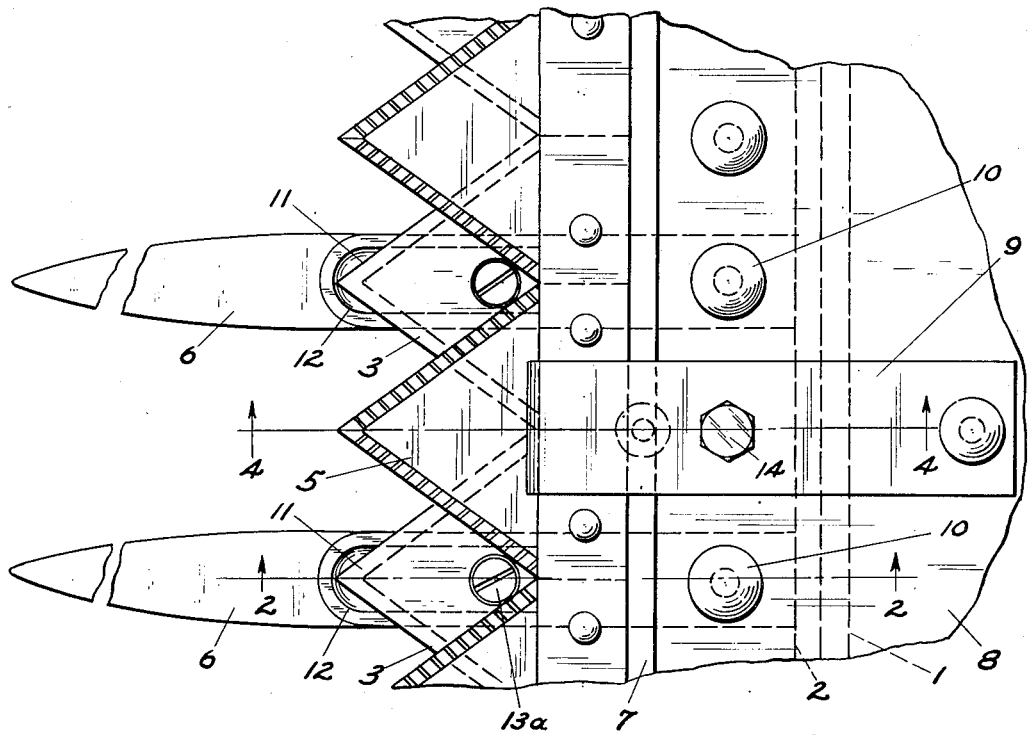
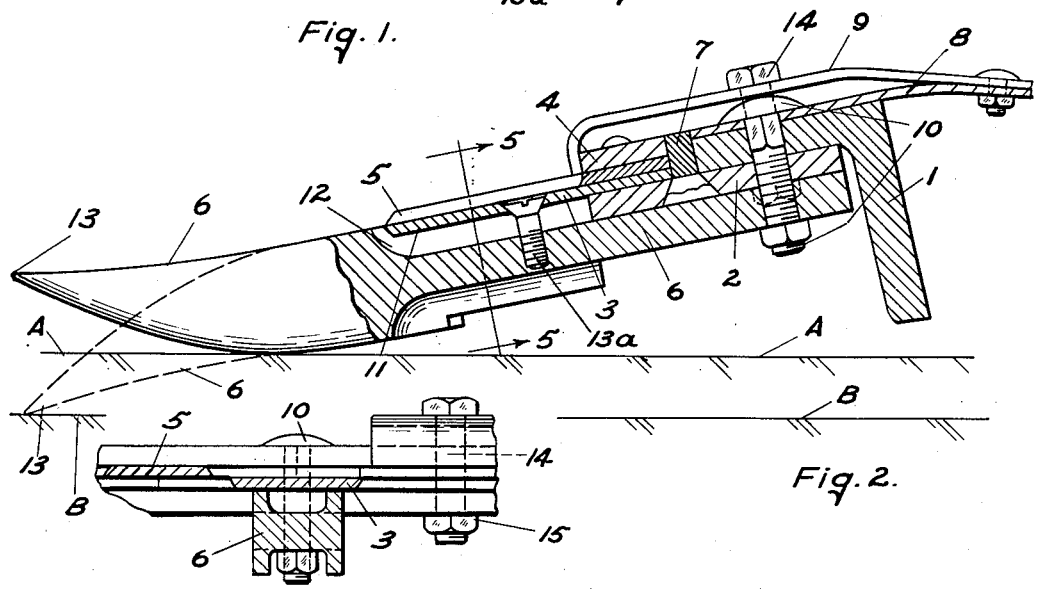

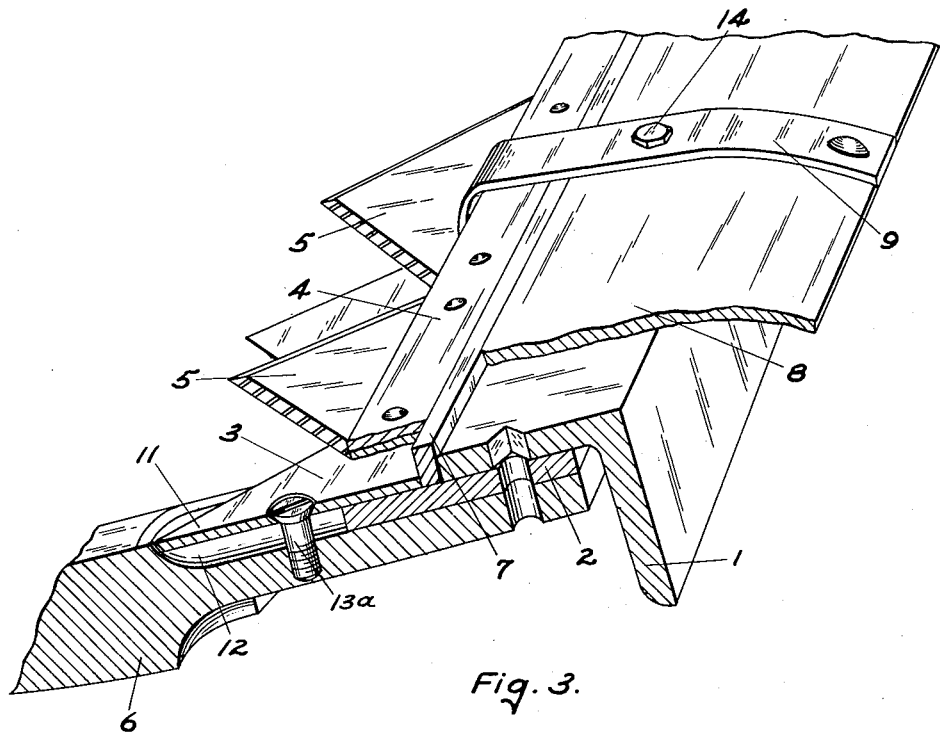
Fig. 3.
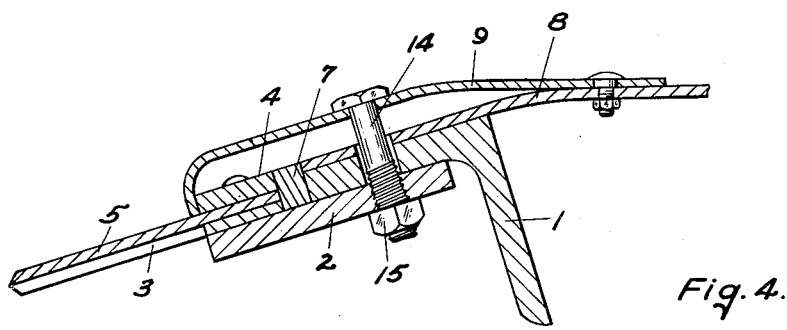
Fig. 4.
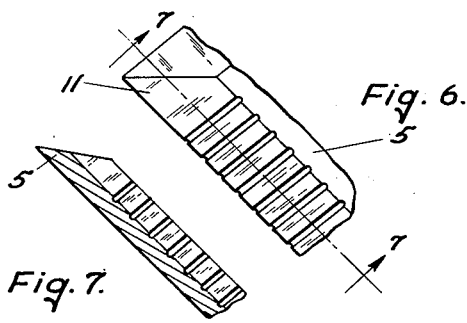
Fig. 6.
Fig. 7.
INVENTOR:
NORMAN R. KRAUSE
BY: *Thiess Olson + Mecklenburger*
ATTYS:

2,528,659

UNITED STATES PATENT OFFICE 2,528,659

CUTTER BAR FOR HARVESTERS

Norman R. Krause, Racine, Wis., assignor to J. I. Case Company, Racine, Wis., a corporation of Wisconsin Application August 23, 1946, Serial No. 692,422

9 Claims. (Cl. 56—298)

My invention relates to cutter-bars for harvesters.

One of the objects of my invention is to provide a cutter-bar arrangement whereby a variety of field conditions can be met.

An object of my invention is to provide a cutter-bar having the ledger plates or corresponding construction independently mounted relative to the guard fingers.

Another object is to provide a cutter-bar in which the guard fingers may be removed without disturbing the operation of the sickle for cutting "lodged" grain (grain lying on the ground). For example, in some cases, a guard might be required to lift grain and in other cases a guard is not desired as occasionally happens whenever the cutting mechanism has to be submerged in damp material.

A typical example of a situation where guards might not be desirable is in harvesting soy beans. As soon as the frost hits this plant, the leaves immediately drop to the ground and then as the ripening process continues on the stalk, these leaves usually remain damp, and if the beans are short and it becomes necessary to bring the guards down close to the ground in order to cut as close as possible, the leaves will impale themselves upon the sharp points of the guards and clog the bar. In such cases, it would be desirable to remove the guard and present only live cutting edges to the material to be cut through in the manner described for the purpose of providing a cutter-bar that will not clog under such conditions.

Very often, when harvesting such crops as oats, which follow the corn crop of the preceding year, parts of corn roots and stalks will be present in the field and continually interfere with the cutting operation, either clogging the guards or sticking at the ends of the guards. Under such conditions, the guards can be removed and the material to be harvested can then be cut with the guards removed.

Another object is to provide a cutter-bar having guard fingers which can be inverted so that the point is closer to the ground, thus allowing the cutter bar rail to be adjusted further from the ground. The result is that the rail will not carry clods of dirt, etc., before it.

Another object of the invention is to provide a ledger plate cutting assembly which can be removed from the machine as a unit and sharpened with the ledger plate sections attached to the bar, by grinding means already in general use.

Conventional guards usually have a ledger plate riveted to the guard which forms the shear edge for the sickle sections, functioning immediately over the ledger plate. This creates a condition wherein such ledger plates cannot be conveniently sharpened.

A further object is to provide a construction in which the lower knife blades prevent lateral displacement of guards.

A further object is to provide a construction in which the knives of the upper and lower assemblies are identical.

A further object of the invention is to provide a simple guard which can easily be detached without dismantling any portion of the machine and which, when attached, will be secured against lateral and vertical displacement. Very often in harvesting conditions such guards are exposed to contact with stones and hard clods, or other foreign debris in the field, and it is obvious that such a guard must be well supported.

Another object of this invention is to provide a ledger plate bar which includes a hardened rectangular element attached to this bar for the purpose of taking the thrust of the knife.

Another object of the invention is to provide a ledger plate construction which includes a knife cutting edge for the reciprocating sickle to cut against. In this manner it is possible to handle the less stiff or grassy type of crops. Very often when combining, cover crops are planted with the grain which usually have a short growth so that whenever it becomes necessary to cut as much straw as desired such cutter bars are submerged into this cover crop and require a decidedly sharp cutting edge in order to function.

Another example might be when harvesting rice. Such a crop could be badly lodged and in such cases it would be very necessary to cut close to the ground, and under such conditions the sickle might be operating through a crop of wet green water grass. Whenever the grain becomes lodged and tangled, a bare double sickle would then be the preferred arrangement for harvesting under such conditions, as in such cases, if guards were used, clogging on the sickle would occur.

Further objects and advantages of the invention will be apparent from the description and claims.

In the drawings, in which an embodiment of my invention is shown,

Figure 1 is a plan view of a cutter-bar construction;

Fig. 2 is a section on the line 2—2 of Fig. 1;

Fig. 3 is a sectional perspective view on the line 2—2 of Figure 1;

Fig. 4 is a sectional view on the line 4—4 of Figure 1 but showing the guard fingers removed;

Fig. 5 is a section on the line 5—5 of Fig. 2;

Fig. 6 is a detail plan view showing the front edge of the sickle section; and

Fig. 7 is a section on the line 7—7 of Fig. 6.

Referring to the drawings in detail, the cutter-bar shown comprises a cutter-bar supporting rail 1, a fixed ledger plate bar 2 secured to the rail, a plurality of ledger plate sections 3 secured to the fixed ledger plate bar, a knife bar 4 reciprocably mounted on the ledger plate bar, a plurality of knife sections 5 secured to said reciprocable bar and co-operating with said fixed ledger plate sections 3, a plurality of removable sickle guard fingers 6 in co-operative alignment with the fixed ledger plate sections, a wear strip 7 preferably welded to the ledger plate bar 2 and abutting the rear edges of the knife bar 4 and the knife sections 3 and 5, a conveyor floor 8 secured to the rail, and a plurality of hold-down clips 9 adjustably secured to the cutter-bar supporting rail 1 and conveyor floor 8.

The guard fingers 6 are secured by bolts 10 to the assembly as shown, the front ends 11 of the ledger plate sections 3 being fitted into recesses 12 in the guards 6. This arrangement prevents material from getting caught or lodged between ledger plate sections and guard fingers.

The ledger plate sections 3 may be secured to and held snugly in engagement with the guard fingers 6 by means of screws 13ª, thus further lessening the chance of material wedging under the points of the sections and forcing the sections away from the guard fingers.

The guards are so made that they can be inverted as shown in dotted lines in Fig. 2. In this position the point 13 of the guard can run close to the ground and yet the bolt 10 will not strike an obstruction. Also, in this position, the point 13 of the guard will tend to lift down grain (that lying close to the ground) and also increase the ground clearance for the cutter-bar supporting rail 1 as indicated by the ground planes A and B.

The knife sections 3 and 5 for the cutter-bar and the ledger plate bar are interchangeable. This uniformity of structure naturally facilitates repairs.

One feature of this invention is that it is possible to remove the guards 6 without disturbing the ledger-plate bar 2, the latter being held in place by the bolts 10 and by bolts 14 and nuts 15. The bolts 14 are threaded into the bar 2 and the nut 15 locks it after hold-down clamp 9 has been adjusted to provide sufficient pressure to assure proper cutting operation.

The reason for removing the guards is to enable the cutting knives 3 and 5 to get close to the ground. With this arrangement the cutting of tangled crops is facilitated. If the guards were allowed to remain, they would dig into the tangled mass of crop and hinder the forward movement of the machine. Fig. 4 shows a section of the cutting bar indicating its proximity to the ground.

Heretofore cutter-bar designs with a variety of guards with ledger plates attached—some guards short, some long, some hooked up, some hooked downward—have failed when it comes to harvesting lodged grain, particularly when such grain includes rather damp, rotten straw. When harvesting soy beans, such a condition also often prevails, and while it does not always stop a machine in the field altogether, it does create delays due to unnecessary stops due to cutter-bar clogging, which naturally cuts down the acreage per day considerably and in itself is a decided nuisance to the operator.

In order to overcome such difficulties, as well as provide a universal cutter-bar arrangement that would also be suitable for handling standing grain, a twin sickle construction is employed in combination with a set of detachable guard fingers.

When cutting standing grain, where the condition of the grain is reasonably favorable, such a bar could be used with either the guards in place or removed, but if such a crop includes considerable short straw, the guards no doubt would be necessary, as otherwise too much cut grain would dribble off onto the ground.

However, when harvesting a badly lodged crop; that is, a crop lying on the ground and tangled, guards often tend to clog, and in such cases the guards can be removed and the resulting combination would be a sort of double sickle that could cut through any tangled mass without clogging.

In this case two sharp edges serve to cut, whereas with the conventional type of cutter-bar the reciprocating knife is cutting against a rather straight-faced, square-cornered ledger plate element which is a part of the guard, and when such square corners round-over to any extent, the cutting is naturally adversely affected. Also, such ledger plate elements cannot be conveniently sharpened.

Replacing ledger plates on the conventional type of guards is a rather slow and tedious job, while with the proposed arrangement the ledger plate assembly can be removed and sharpened by means of conventional sickle sharpening devices already in general use.

Such a cutter-bar assembly would also increase the capacity of a combine when harvesting a very thin crop, as a double sharp-edged sickle combination would be a more effective cutting device and would permit faster ground speeds so that more acres could be harvested per day at a less cost per acre.

Further modifications will be apparent to those skilled in the art and it is desired, therefore, that the invention be limited only by the scope of the appended claims.

Having thus described my invention, what I claim and desire to secure by Letters Patent is:

1. A cutter-bar construction comprising a cutter-bar supporting rail, a fixed ledger plate bar, securing means extending through said supporting rail and ledger plate bar for securing them together, a plurality of ledger plate sections secured to said fixed bar, a knife bar reciprocably mounted with respect to said fixed bar, and a plurality of knife sections secured to said reciprocable bar and co-operating with said fixed ledger plate sections.

2. A cutter-bar construction comprising a cutter-bar supporting rail, a fixed ledger plate bar, securing means extending through said supporting rail and ledger plate bar for securing them together detachably, a plurality of ledger plate sections secured to said fixed bar, a knife bar reciprocably mounted with respect to said fixed bar, a plurality of knife sections secured to said reciprocable bar and co-operating with said fixed ledger plate sections, and a plurality of guard fingers detachably secured to said cutter-bar construction.

3. A cutter-bar construction comprising a cutter-bar supporting rail, a fixed ledger plate bar detachably secured to said rail, a plurality of ledger plate sections secured to said fixed bar, a knife bar reciprocably mounted with respect to said fixed bar, a plurality of knife sections secured to said reciprocable bar and co-operating with said fixed ledger plate sections, and a plurality of guard fingers detachably secured to said cutter-bar construction, the means for securing the fixed bar comprising bolts extending through the fixed bar and rail, and the means for securing the guard fingers comprising bolts extending through the guard fingers, fixed bar and rail.

4. A cutter-bar construction comprising a cutter-bar supporting rail, a fixed ledger plate bar secured to the under side of said rail, a plurality of ledger plate sections secured to said fixed bar, a knife bar reciprocably mounted with respect to said fixed bar, and a plurality of knife sections secured to said reciprocable bar and co-operating with said fixed ledger plate sections.

5. A cutter-bar construction comprising a cutter-bar supporting rail, a fixed ledger plate bar detachably secured to said rail, a plurality of ledger plate sections secured to said fixed bar, a knife bar reciprocably mounted with respect to said fixed bar, a plurality of knife sections secured to said reciprocable bar and co-operating with said fixed ledger plate sections, a plurality of guard fingers detachably secured to said cutter-bar construction, a plurality of hold-down clamps for said reciprocable bar, the means for detachably securing the fixed bar comprising bolts extending through the fixed bar, cutter-bar supporting rail and hold-down clamps, and the means for detachably securing the guard fingers comprising bolts extending through the guard fingers, fixed bar, and cutter-bar supporting rail.

6. A cutter-bar construction comprising a knife bar support, a knife bar reciprocably mounted on said support, and a plurality of guard fingers detachably secured to said cutter-bar construction, each guard finger having its advance end offset with respect to the axis of the finger and having a shank having two oppositely facing faces, either one of which may be brought into engagement with a face on the cutter-bar construction whereby the guard finger may be removed and secured to the bar upside down, to change the elevation of the advance end of the guard finger with respect to the rail.

7. A universal cutter-bar construction comprising a cutter-bar supporting rail, a ledger plate supporting bar including a plurality of ledger plate sections extending grainwardly, said last mentioned bar being detachably secured to the cutter-bar supporting rail, a knife bar reciprocably carried by said ledger plate supporting bar and co-operating therewith, a hold-down member arranged to maintain the reciprocable knife bar in operative relationship to said fixed ledger plate sections, and a thrust member intermediate said supporting rail and said knife bar.

8. In combination with a cutter-bar having a ledger plate fixed thereto, a forwardly-extending grain guard secured to the under surface of said cutter-bar and having an upwardly-directed point, said guard having oppositely-positioned ledger plate seats to allow inversion of said guard so said point may be directed either upwardly or downwardly.

9. A cutter-bar construction comprising a cutter-bar supporting rail, a fixed ledger plate bar secured to said rail, a plurality of ledger plate sections secured to said fixed bar, a knife bar reciprocably mounted with respect to said fixed bar, and a plurality of knife sections secured to said reciprocable bar and co-operating with said fixed ledger plate sections, the front edges of said plurality of ledger plate sections and the front cutting edges of said plurality of knife sections forming continuous zigzag multi-angular lines in plan view, the front apices of both zigzag lines lying in the same general vertical plane and the rear apices of both zigzag lines lying in the same general vertical plane whereby in relative longitudinal movement between the bars there will be continuous shearing action between each knife section and a corresponding ledger plate section from the point of rear engagement between the knife section and the ledger plate section until the point of front engagement between the knife section and the ledger plate section and whereby the front apices of the two zigzag lines will be in registration with each other at the same time that the rear apices of the two zigzag lines will be in registration with each other.

NORMAN R. KRAUSE.

REFERENCES CITED

The following references are of record in the file of this patent:

UNITED STATES PATENTS

| Number | Name | Date |
|---|---|---|
| 350,456 | Forsbee | Oct. 5, 1886 |
| 489,062 | Wilson | Jan. 3, 1893 |
| 1,869,981 | Paradise | Aug. 2, 1932 |